(12) United States Patent
Cushing

(10) Patent No.: US 10,257,882 B2
(45) Date of Patent: Apr. 9, 2019

(54) COMMUNICATIONS ASSEMBLY AND APPARATUS

(71) Applicant: AIRWAVE SOLUTIONS LTD, Slough Berkshire (GB)

(72) Inventor: Andrew Cushing, Shotley Gate (GB)

(73) Assignee: AIRWAVE SOLUTIONS LTD, Slough Berkshire (GB)

( * ) Notice: Subject to any disclaimer, the term of this patent is extended or adjusted under 35 U.S.C. 154(b) by 0 days.

(21) Appl. No.: 15/679,434

(22) Filed: Aug. 17, 2017

(65) Prior Publication Data

US 2017/0347392 A1 Nov. 30, 2017

Related U.S. Application Data

(62) Division of application No. 14/421,812, filed on Feb. 13, 2015, now Pat. No. 9,775,193.

(51) Int. Cl.
| | |
|---|---|
| *H04W 12/02* | (2009.01) |
| *H04W 88/06* | (2009.01) |
| *H04W 40/02* | (2009.01) |
| *H04W 12/06* | (2009.01) |
| *H04W 84/08* | (2009.01) |
| *H04W 92/18* | (2009.01) |

(52) U.S. Cl.
CPC .......... *H04W 88/06* (2013.01); *H04W 40/02* (2013.01); *H04W 12/02* (2013.01); *H04W 12/06* (2013.01); *H04W 84/08* (2013.01); *H04W 92/18* (2013.01)

(58) Field of Classification Search
None
See application file for complete search history.

(56) References Cited

U.S. PATENT DOCUMENTS

| | | | | |
|---|---|---|---|---|
| 6,763,226 | B1 * | 7/2004 | McZeal, Jr. | ........ H04B 7/18595 455/90.2 |
| 8,280,422 | B2 * | 10/2012 | Forsten | ................... H04W 4/10 455/518 |
| 2004/0219881 | A1 | 11/2004 | Kramp et al. | |
| 2005/0114525 | A1 * | 5/2005 | Vimpari | ............ H04L 29/12009 709/228 |
| 2005/0215284 | A1 * | 9/2005 | Su | ...................... H04W 72/1215 455/556.2 |
| 2008/0171567 | A1 | 7/2008 | Kossi | |
| 2009/0239527 | A1 * | 9/2009 | Forsten | ................... H04W 4/10 455/426.1 |

(Continued)

FOREIGN PATENT DOCUMENTS

| | | |
|---|---|---|
| WO | 9523485 A1 | 8/1995 |
| WO | 2007088247 A1 | 8/2007 |

*Primary Examiner* — Lana N Le

(57) ABSTRACT

A communications assembly including a first mobile station communicatively coupled to a public mobile radio network, a second mobile station communicatively coupled to a private mobile radio network, and a communications interface module configured to provide a communication conduit between the first mobile station and second mobile station, for routing: a communication originating from the first mobile station through the communications interface module for transmission over the private mobile radio network via the second mobile station, and a communication initiated at the communications interface module for transmission over the public mobile radio network via the first mobile station device.

7 Claims, 7 Drawing Sheets

(56) References Cited

U.S. PATENT DOCUMENTS

| | | |
|---|---|---|
| 2010/0216436 A1 | 8/2010 | Wijayanathan et al. |
| 2010/0323742 A1* | 12/2010 | Allen ................ H04W 76/45 |
| | | 455/519 |
| 2011/0158207 A1* | 6/2011 | Alberth, Jr. .......... G06Q 10/109 |
| | | 370/338 |
| 2011/0237287 A1 | 9/2011 | Klein et al. |
| 2012/0314571 A1 | 12/2012 | Forssell |
| 2013/0088514 A1 | 4/2013 | Breuss-Schneeweis et al. |
| 2014/0112462 A1 | 4/2014 | Si et al. |
| 2015/0131510 A1* | 5/2015 | Gilbert ................ H04W 72/005 |
| | | 370/312 |
| 2016/0269876 A1* | 9/2016 | Senese ................ H04L 61/106 |
| 2017/0104794 A1 | 4/2017 | Young et al. |
| 2017/0231014 A1* | 8/2017 | Patel ................ H04W 4/10 |

* cited by examiner

COMMUNICATIONS ASSEMBLY AND APPARATUS

CROSS REFERENCE TO RELATED APPLICATION

The present application is a divisional of the following U.S. application commonly owned with this application by Airwave Solutions Ltd: Ser. No. 14/421,812, filed on Feb. 13, 2015 titled "Communications Assembly and Apparatus", which claims priority to PCT Application No. PCT/GB13/51476 filed on Jun. 3, 2013, the entire content of which is being incorporated herein by reference.

FIELD

The present invention relates to a communications assembly and apparatus. In particular, but not exclusively, the present invention relates to a communications assembly and apparatus for private mobile radio (PMR) communications systems such as, without limitation, the Terrestrial Trunked Radio (TETRA) system and the P25 or APCO-25 Land Mobile Radio system.

BACKGROUND

PMR communications systems, and TETRA in particular, are suitable for use by emergency services, government agencies, public safety networks and the military where security and reliability of communications is of paramount importance. PMR systems are also used in commercial enterprises, for example in distributed or wide area locations such as large industrial sites, mine environments and the like.

A PMR system often comprises a single main site over which radio communications signals are transmitted from a Base Transceiver Station (BTS). Such a site may be termed a "cell" or "main site" and the operator of such a site may be termed a TETRA Network Operator (TNO). Mobile transceiver units, termed "Mobile Stations (MS)" in the TETRA standard lexicon, receive and transmit radio communications from and to the BTS when in the site/cell coverage area. In common with many radio communication systems, PMR radio systems such as TETRA can suffer from gaps in coverage due to a variety of reasons such as the terrain, intervening structures such as buildings and within buildings or tunnels for example.

There are also known public mobile radio networks, for example cellular telephone networks, operated by so-called Mobile Network Operators (MNO). Cellular telephone networks generally support data communications services and are known as second-generation (2G), third-generation (3G) and fourth-generation (4G) with each later generation providing greater data communications services than the previous generation.

Due to their generally lower operating frequencies and narrower communications channels PMR systems often have better rural coverage than cellular telephone networks, however data bandwidths are invariably lower than can be achieved by the public networks.

Aspects and embodiments of the present invention were devised with the foregoing in mind.

SUMMARY

Viewed from a first aspect there is provided a communications assembly, comprising:

a first device operable for a public mobile radio network;
a second device operable for a private mobile radio network; and
a communications interface module configured to provide a communications conduit between said first and second devices over a local communications medium for routing:
a communication originating at said first device through said communications interface module to said second device for transmission over said private mobile radio network; and optionally or additionally
a communication initiated at said communications interface module to said first device for transmission over said public mobile radio network.

Viewed from a second aspect there is provided a communications assembly, comprising:

a first device operable for a public mobile radio network;
a second device operable for a private mobile radio network; and
a communications interface module configured to provide a communications conduit between said first and second devices over a local communications medium for routing:
a communication received at said first device from said public mobile radio network through said communications interface module to said second device; and optionally or additionally
a communication received at said second device from said private mobile radio network through said communications interface module to said first device.

The communications interface module provides for a first device such as a Smartphone to collaborate with a second device such as a PMR terminal without the need for development or modification of a standard second (PMR) device. Collaboration allows use to be made of the available network services through the general superior Man Machine Interface of a Smartphone compared to a PMR terminal.

The communications interface module of the second aspect may also provide a communications conduit between said first and second devices over a local communications medium for routing:

a communication originating at said first device through said communications interface module to said second device for transmission over said private mobile radio network; and optionally or additionally
a communication initiated at said communications interface module to said first device for transmission over said public mobile radio network. Such an arrangement supports the connection of the first and second devices using a radio technology which can then provide for interworking of the devices.

For applications requiring secrecy the communications interface module is configured to provide a secure communications conduit between said first and second devices over said local communications medium. The interface module can be developed to provide a level of security acceptable to different user markets without the need for custom developments of the second (PMR) device. This may be very important for emergency services, police and military use for example.

Typically, the secure communications conduit employs commercial standard encryption which would provide a relatively low cost solution. However, the secure communications conduit may employ encryption approved for protection of government protectively marked material if necessary. By having the interface module, it is possible for specific government or other standards to be followed without the need for customisation of the second (PMR) device itself.

Suitably, the first device is configured to establish a secure mutually authenticated session to said communications interface module prior to said secure communications conduit being established. By layering on additional authentication at the application layer of the first device (generally a more easily adapted device such as a smartphone) it becomes possible to provide extra assurance of the link for more sensitive user markets.

The first device may be configured to determine one or more network capabilities of respective said private mobile radio network. For example, the one or more network capabilities may include one or more of the following: signal quality, communications capability and bandwidth. Once the devices are connected it then becomes possible for a wider awareness of combined communication capabilities to be established. A number of factors can be used to influence the best choice of network for any given communication, these may include the quality of the signal which will directly affect the communications performance, the available communications capability which will affect what can be communicated and the bandwidth which can impact performance for the both the user and other users of the system.

Optionally or additionally, the first and/or second devices are configured to determine respective geographic location, for example by way of the global positioning satellite (GPS) system and/or based upon radio network access point information. Both the Smartphone and the PMR device may have GPS capability and so both facilities should be used to determine GPS position in case one or other facility is working better than the other.

Optionally, the first device may determine network information from a central network application for said public telecommunications system and/or said private mobile radio system.

By communicating with the central network application additional intelligence or guidance can be accessed to make better decisions as to what communications channel should be used. An example of this may be instructing the second (PMR) device to switch Talkgroups when moving to a different area, or guiding the device to select the public mobile radio network for less critical group communications during times when the important communications traffic may be high, such as during a major emergency incident.

Suitably, location information for respective first and second devices is compared on said first device to identify the best location fix as the first device may have greater processing power and/or be capable of running applications. Also the two devices are likely to be worn in different places on the body and may have different sensitivities with regards to GPS so it makes sense to determine if one or other of the GPS devices is performing better than the other.

The first device may be configured to:

retrieve information concerning said one or more network capabilities from said second device via said communications interface module;

select said one or other of said public mobile radio network or said private mobile radio network for transmitting or receiving said communication based on said one or more network capabilities and/or said respective geographic locations and/or said network information. By making the central application aware of the communications capabilities available to the first and second devices end user it is possible to route outbound communications from the network to the most appropriate device over the most appropriate network at any given time.

The first device may be configured to communicate said location fix to respective network applications over a selected one of said public mobile radio network or said second private mobile radio network. Depending on the existing network conditions it may be appropriate to route the user location information back over different networks, for example if the PMR network is suffering from control channel congestion it may be better to provide the update over the public network.

The first and second device may be configured to periodically determine said one or more network capabilities and/or said geographic location to provide updated information thereon; and said first device may be configured to select said one or other of said public mobile radio network and said private mobile radio network for communications based on said updated information; and optionally said first device may be configured to periodically determine said network information to provide updated network information and select said one or other of said public mobile radio network and said private mobile radio network based on said updated network information. By periodically checking current capabilities and exchanging the information with the central network application it becomes possible to dynamically tune communications across the network to ensure the best possible experience for the user community as a whole.

Suitably, the first device is configured to communicate information identifying said selected one of said public mobile radio network and/or said private mobile radio network to central network applications. As the first device (eg Smartphone) has the most processing capability it can be configured to more effectively process the available communications capabilities and send that information back to the network.

The first device may be configured to provide a second device communications inhibit signal to said communications interface module responsive to selection of said public mobile radio network for communications, said communications interface module responsive to said second device communications inhibit signal to inhibit communication via said second device and private mobile radio network.

Typically, the communications interface module may be responsive to said second device communications inhibit signal to inhibit an impedance change on a microphone circuit of said second device since the impedance change is what signals a PTT communication for a second device such as a TETRA terminal.

Suitably, the first device is configured to provide a user interface operative to generate control signals for said second device and route said control signals to said second device via said communications interface module. As the second (PMR) device is often worn in a position which makes it difficult to be operate and also as the man machines interface on the second (PMR) device tends to have a limited capability both in screen size and keyboard, access to the second (PMR) device functionality from the first (smartphone) device interface is both beneficial and effective. In addition through use of the first (smartphone) device interface the user interface requirements of the second (PMR) device are reduced which allows for cheaper and more robust devices to be used.

The first device may be configured to provide a user display operative to receive control messages from said second device and route said control signals from said second device via said communications interface module. Thus, the generally better user interface of a first device such as a smartphone can be used. For example, when communications such as text messages are received by the PMR device they can be passed to the smartphone which provides a better man machine interface for presentation to the user.

The communications interface module may provide a common audio interface for communications over said public mobile radio network or said private mobile radio network. By having a common audio interface, communications received from either network can be presented in the most convenient way (either headset or remote speaker microphone) which means the first device (smartphone) can continue to be used as the data interface or can be left securely in a pocket when receiving calls.

Suitably, the communications interface module provides a push to talk switch for group communications over said public mobile radio network or said private mobile radio network. By having an external push to talk switch the user does not need to be aware of which networks are available as the device determines the most appropriate network and routes the communication accordingly.

Preferably, the communications interface module is a separate article from said first and second device. By developing the external device the time and cost constraints associated with developing the capabilities with the second (PMR) device can be avoided, this also simplifies the variations in configurations required on the first device (smartphone).

The communications interface module may be configured to interengage with said second device to provide electrical connection for electronic communication between said communications interface module and said second device. By connecting directly to the second (PMR) device concerns over weaknesses in radio interfaces for simple devices such as Bluetooth® can be overcome. Furthermore, the interface module may be supported by the second device through mechanical engagement.

The communications interface module may receive power from said second device. By taking power from the second (PMR) device cost, size, weight and complexity of the interface module can be minimised.

Advantageously, the communications conduit is wireless. The communications conduit may comprise a wireless communication between said communications interface module and said first device. Keeping the communications wireless between the first device (smartphone) and the interface module avoids wires that could provide awkward to manage and in the worst case may be dangerous to a user in violent situations.

Suitably, the communications interface module is coupled to a microphone and/or an earpiece for said second device. By presenting the audio from the first device (smartphone) to the interface module it becomes possible to continue to use the first device (smartphone) as a data interface whilst in a call and also allows the first device (smartphone) to remain in a pocket when receiving a call.

The communications interface module may be coupled to said microphone and/or said earpiece via a wired connection and/or said communications interface module is integrally formed with a microphone and/or a speaker. By providing a flexible common audio interface the best configuration can be selected based upon the user requirements which may either be headset or remote speaker microphone, Additionally, audio from the two devices can be combined, presented in parallel, or muted through configuration.

Viewed from a third aspect there is provided a communications interface module for a communications assembly according to any of the preceding definitions. A separate communications interface module allows for back compatibility with existing second devices such as TETRA and other PMR terminals.

Viewed from a fourth aspect there is provided a communications interface module configured to provide a communications conduit over a local communications medium between a first communications device operative for a public mobile radio network and second communications device operative for a private mobile radio network for routing:

a communication originating at said first device through said communications interface module to said second device for transmission over said private mobile radio network; and optionally or additionally a communication initiated at said communications interface module to said first device for transmission over said public mobile radio network.

LIST OF FIGURES

A specific description of one or more embodiments in accordance with the present invention will now be described, by way of non-limiting example only, and with reference to the accompanying drawings in which.

Figure 4:
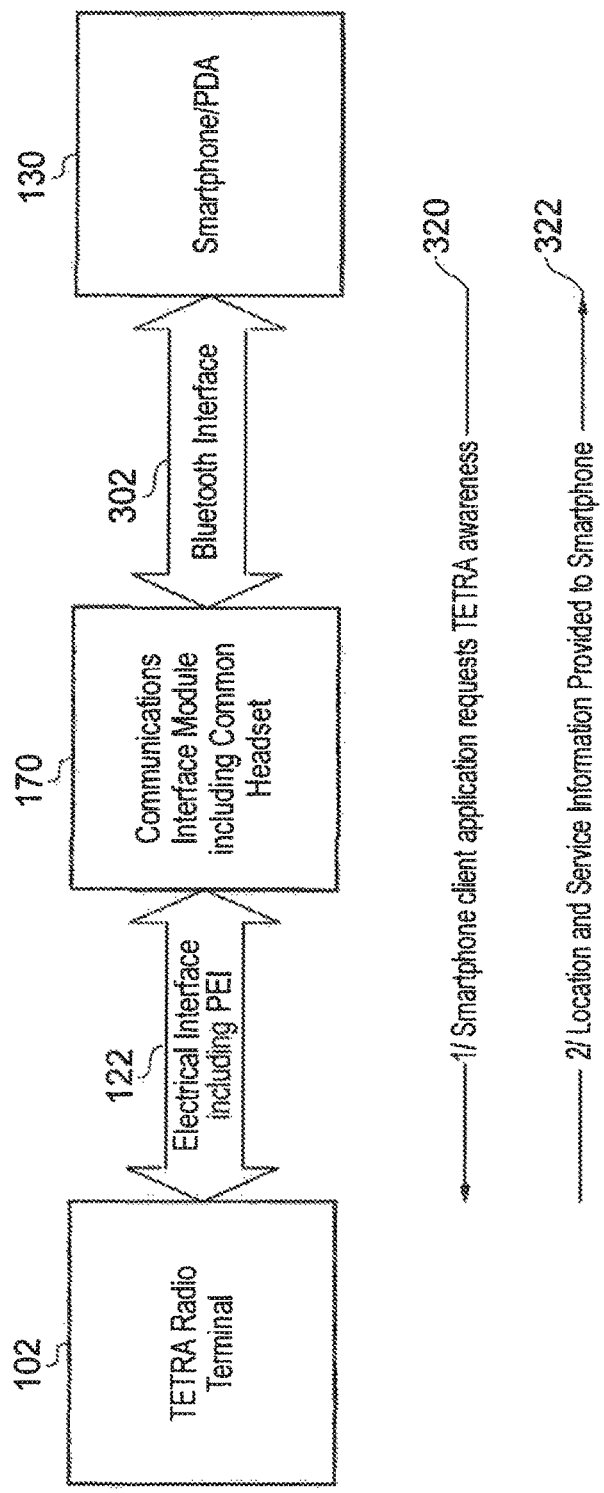
Figure 5:
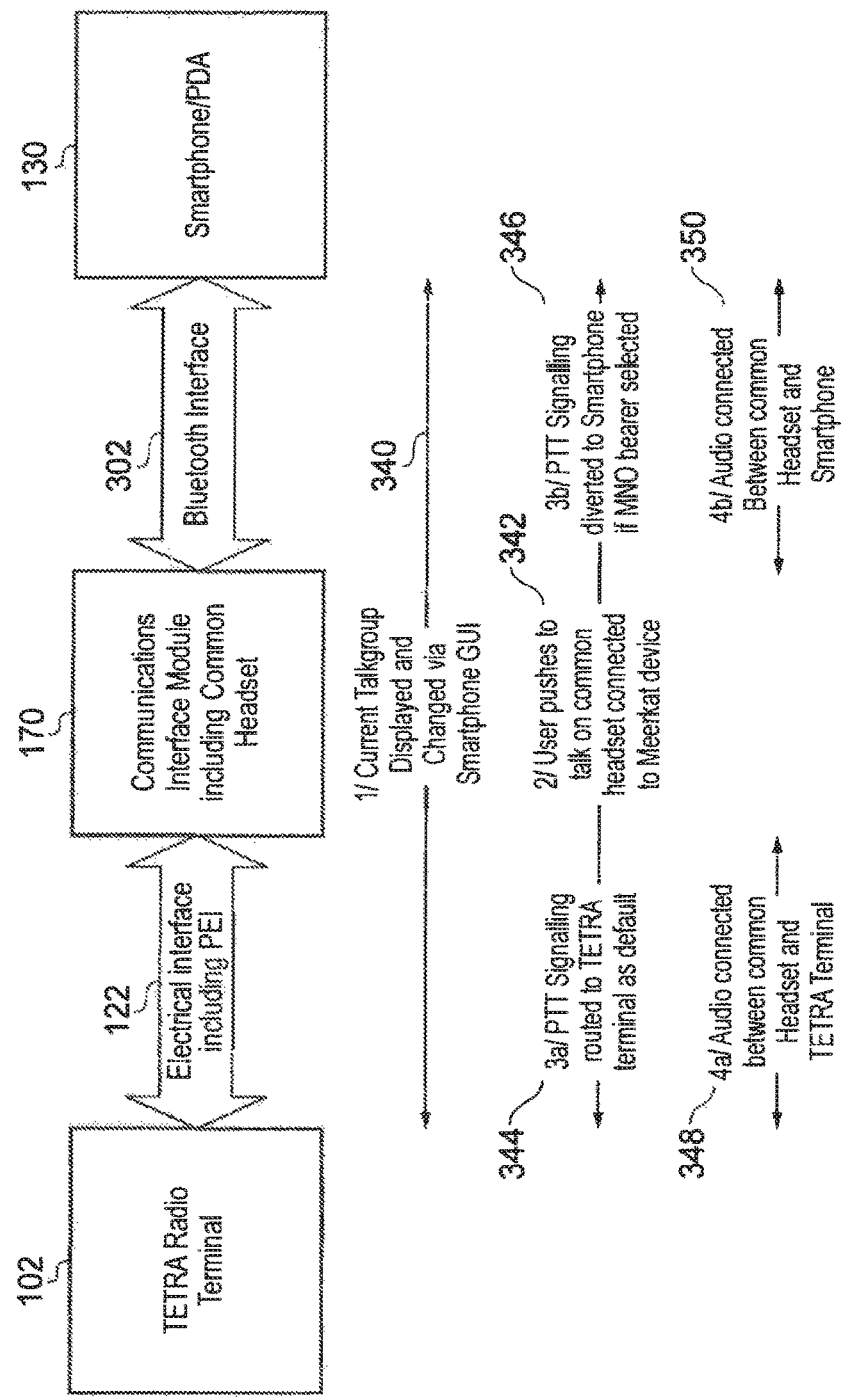
Figure 6:
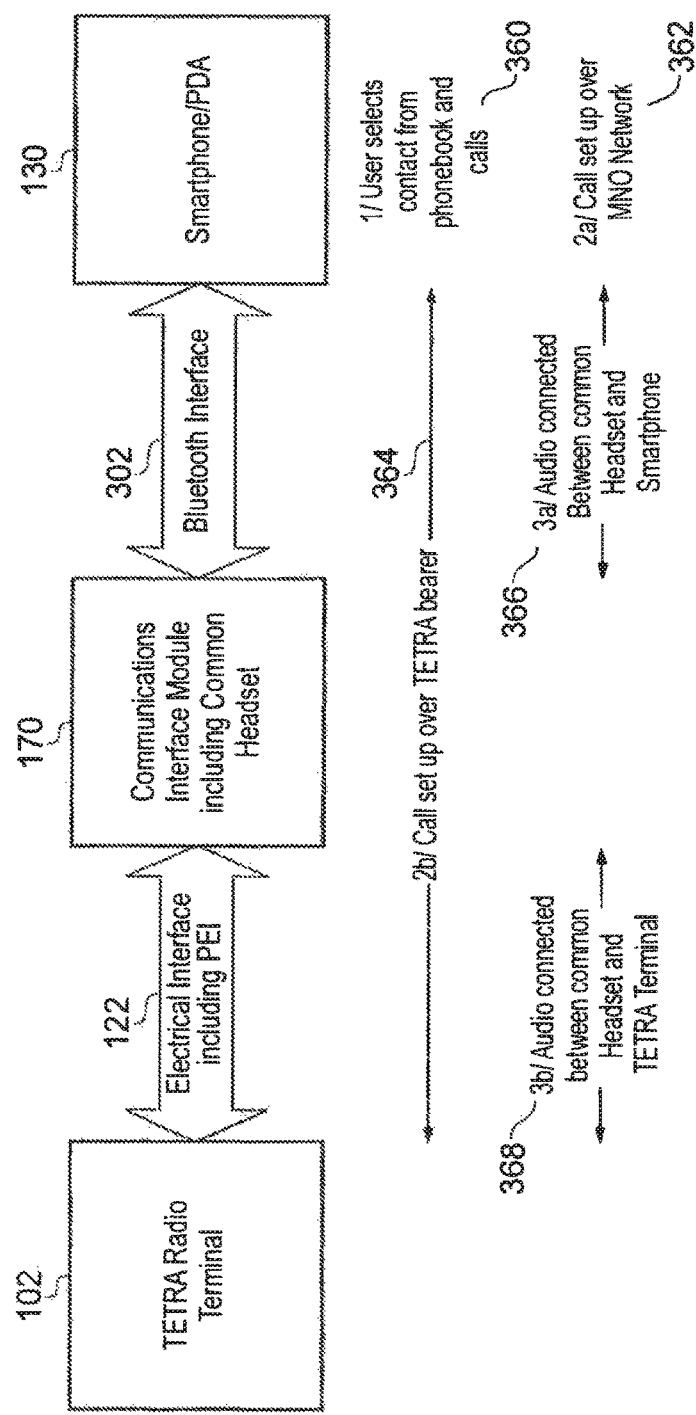
Figure 7:
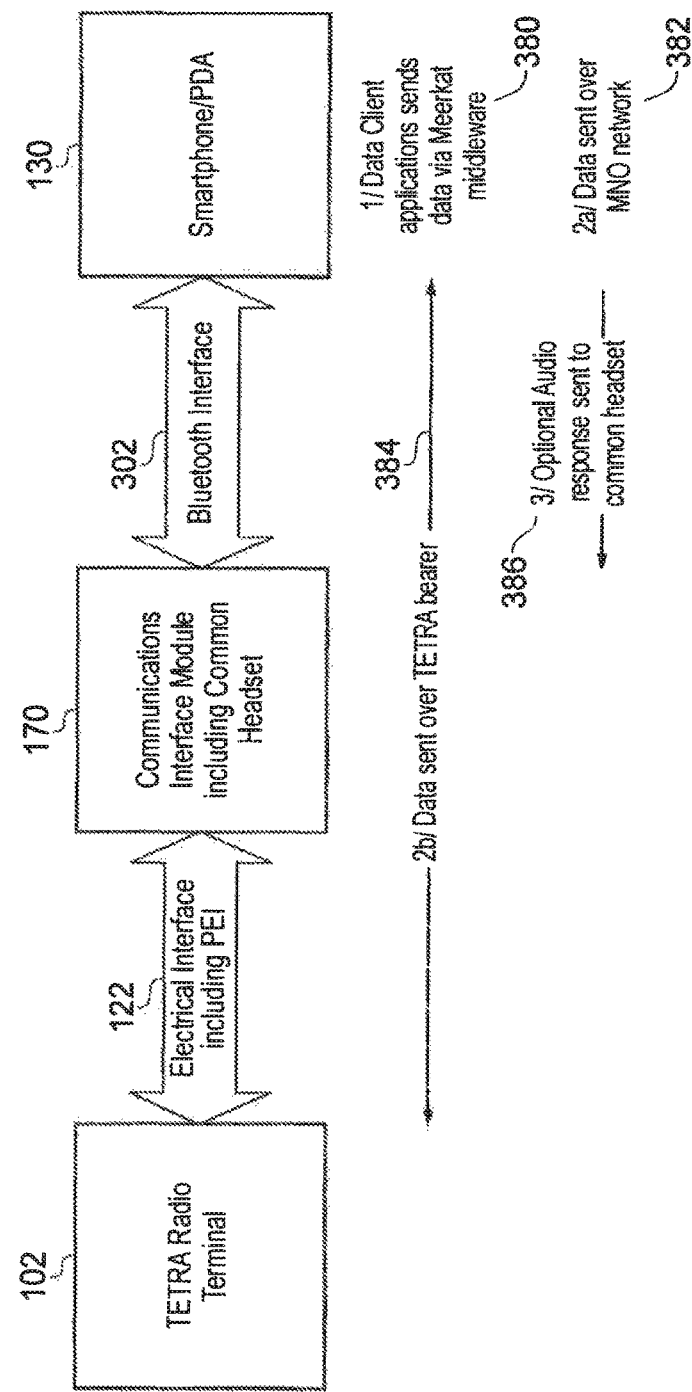

FIG. 4 schematically illustrates the operational flow in an embodiment of the present invention to establish awareness of location;

FIG. 5, schematically illustrates the operational flow in an embodiment of the present invention during a group talk operation;

FIG. 6 schematically illustrates the operational flow in an embodiment of the present invention during an individual call; and FIG. 7 is a schematic illustration of the operational flow in an embodiment of the present invention during data communications.

DESCRIPTION

Embodiments in accordance with the present invention will now be described with reference to FIG. 1 which illustrates an arrangement 100 including a TETRA communications network 166, typically used in the UK by the emergency services amongst other users, and a cellular telephony network 168. A TETRA mobile station 102 comprises the usual elements of a telecommunications device including a display 104, a radio-frequency module 106, and antenna 108, a digital signal processing module 110 and baseband processing module 112. Also included are a keypad 114 and an audio module 116.

Each of the various modules perform their usual functions for a TETRA mobile station which in short comprises the baseband processor 112 controlling the general activities of the terminal device including interrogating the keypad 114 and arranging for the presentation of information on display 104. The digital signal processor 110 encodes audio signals to be transmitted via the radio-frequency unit 106 and decodes signals from the radio-frequency unit 106.

The audio module 116 receives analogue audio signals from microphone 118 and inputs them to an analogue to digital converter within the audio module 116 for forwarding to digital signal processor 110. Digital signals processed by digital signal processor 110 are forwarded to audio module 116 into a digital to analogue converter within the audio module 116 which outputs an analogue audio signal to earpiece 120.

The TETRA mobile station 102 also includes a Peripheral Equipment Interface (PEI) module 122. The PEI is defined in the TETRA standard ETS 300 392-5 and defines the data and control signals which may be sent to and received by the TETRA mobile station 102 from external sources in order to manage and/or control the TETRA mobile station 102 and/or the external source.

The TETRA mobile station 102 may communicate over a radio-frequency channel with a base station 154 of the TNO network 166. The base station 154 is coupled to a TETRA radio access node 156 which in turn is coupled over a trunk connection to a voice control application 162 controlled by the TNO. The voice control application in the TNO network infrastructure is configured to monitor i.e. to be aware of, all of the available radio paths available to the TETRA mobile station 102 including (but not limited to) the TETRA network 166, cellular telephony network 168, local networks such as WiFi etc and then routes voice communications to the TETRA mobile station 102 based upon a determination of the most appropriate path. The radio access node 156 is also coupled over a trunk connection to a data application 164 of the cellular telephony network 168 controlled by the MNO. Data application 164 is also configured to monitor available radio paths and to choose the one most suitable for data communications.

A public mobile radio network data capable device 130, such as a smart phone for a cellular telephony network 168 comprises the usual functional modules incorporated in such devices.

Examples of smart phones range from predominantly voice telephony devices incorporating a World Wide Web browser application capable of connection to the World Wide Web through to devices which incorporate the features of a Personal Digital Assistant (PDA) and a suite of data applications including applications for communicating with the World Wide Web as well as telephony services.

In the illustrated embodiment, the smart phone device 130 incorporates a touch screen display 132 a radio-frequency unit 136 and radio-frequency antenna 136. Device 130 also includes a digital signal processor 138 and a baseband processor 140. Also included is a screen driver 142 for managing what is displayed on the touch screen 132 and handling user input made via the touchscreen 132. Smart phone device 130 also includes applications 144, such as middleware applications and client applications, suitably stored in persistent memory, for managing communications with the communications interface module 170. The middleware performs a number of functions including the following (i) establishment of secure pairing with the TETRA mobile station 102 via the communications interface module 170 (ii) collection and processing of available network connectivity from all available networks for presentation to supported applications on the Smartphone device (iii) providing a path to enable applications on the Smartphone device to present the Man Machine Interface (MMI) of the TETRA mobile station 102.

The audio module 146 is coupled to both the microphone 148 and loudspeaker 150; and receives digital signals from DSP 138 into a digital to analogue converter for output as analogue signals to loudspeaker 150 and vice versa receives analogue signals from microphone 148 into an analogue to digital converter for input to DSP 138. Smart phone device 130 also includes a local wireless communications module 152 which includes a Bluetooth® communications part and a Wi-Fi part.

The smart phone device 130 may communicate over a radio-frequency channel with a base station 158 of the MNO network 168. The base station 158 is coupled to a MNO radio access node 160 operable for data communications on one or more of a second-generation, third-generation and fourth-generation cellular communications protocol, and which in turn is coupled over a trunk connection to a data middleware application 164 controlled by a data service provider. The data middleware application in the MNO network infrastructure monitors, i.e. is aware of, all of the available radio paths available to the user including (but not limited to) the cellular telephony network 168, TETRA network 168, local networks such as WiFi etc and then routes data communications to the user based upon the most appropriate path.

The radio access node 160 is also coupled over a trunk connection to bearer aware, and voice control module 162 of the TNO.

Figure 1:
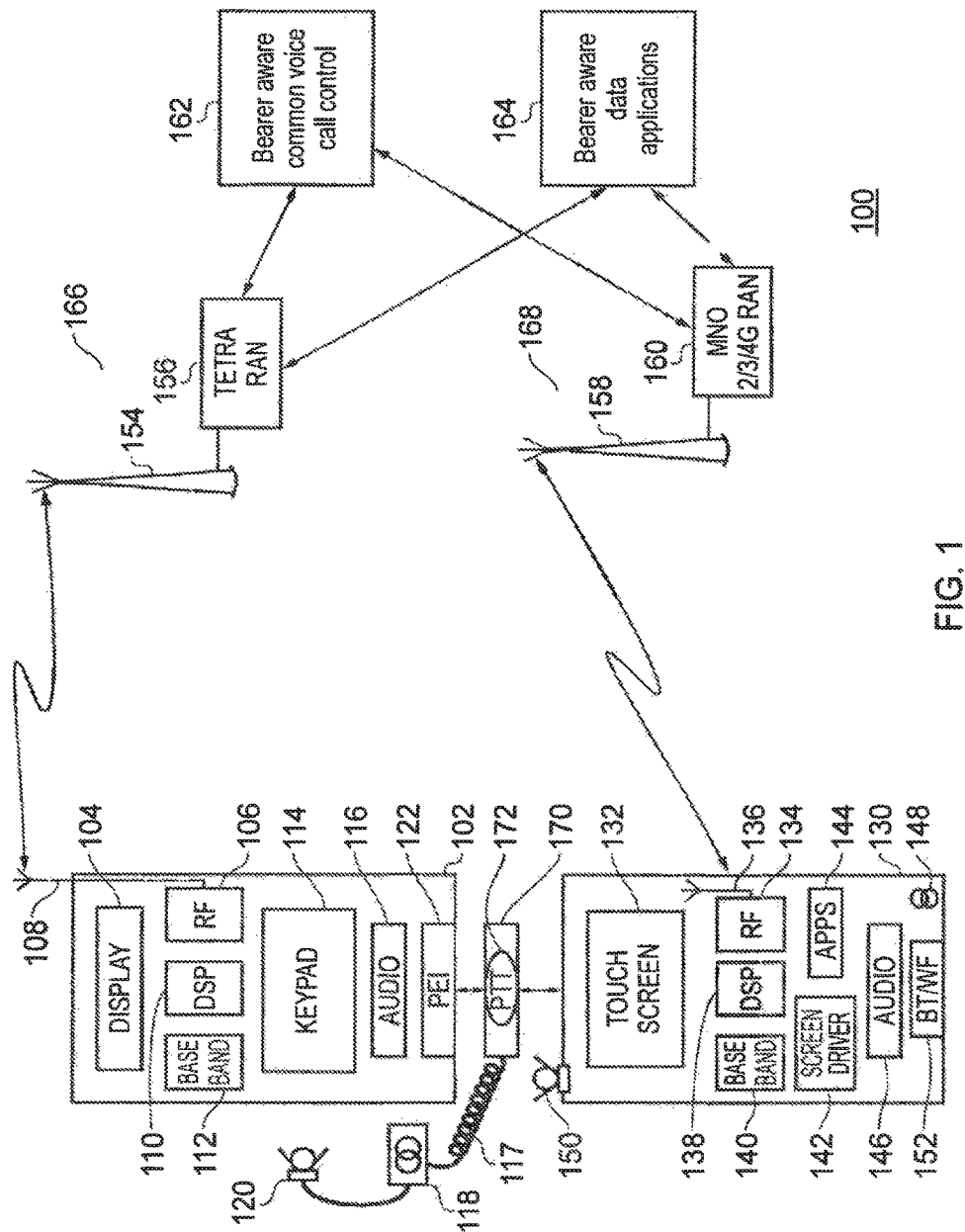
FIG. 1 is a schematic illustration of a network including an assembly in accordance with an embodiment of the present invention.

FIG. 1 also illustrates a communications interface module 170 arranged to interface with TETRA mobile station 102 and smart phone device 134 for communicating PEI signals between them. The illustrated communications interface module 170 also includes a button, 172, to initiate a Push To Talk (PTT) communication. In the described embodiment the communications interface module 170 includes "curly cable" 117 which is coupled to microphone 118 and earpiece 120. Having the microphone 118 and headset 120 connected to the TETRA terminal device, albeit via communications interface module 170, by a curly cable is a typical physical configuration for TETRA devices, although such an arrangement is not essential and the microphone and/or speaker may be mounted within the terminal device 102 itself or directly in the communications interface module 170.

Figure 2:
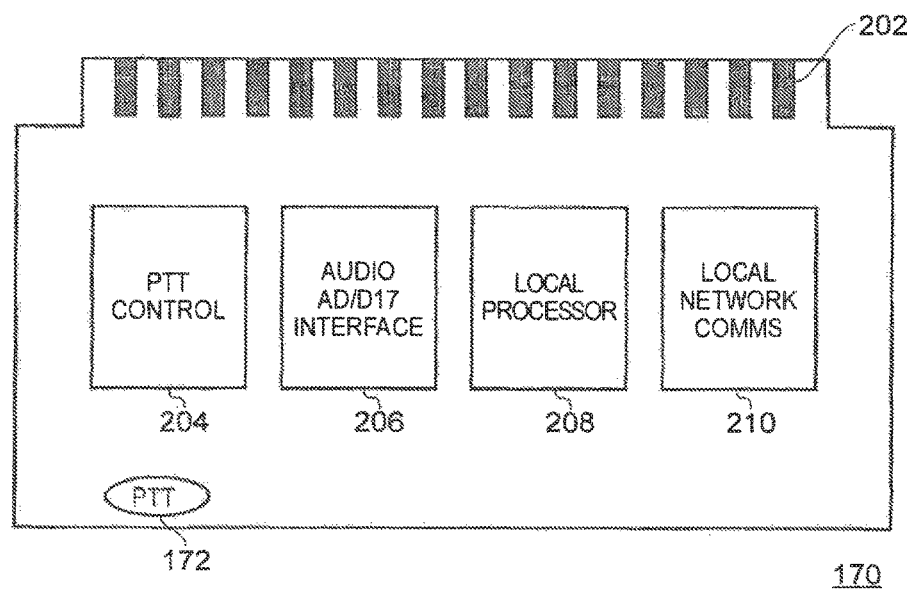
FIG. 2 is a schematic illustration of a communications interface module in accordance with an embodiment of the present invention.

In FIG. 2, there is schematically illustrated the communications interface module 170. In the described embodiment the communications interface module 170 is a plug-in module to TETRA mobile station 102. A simple printed circuit connector element 202 is used to provide a connections interface between the communications interface module 170 and TETRA mobile station 102. Communications interface module 170 comprises a PTT module 204 configured to receive a PTT initiation signal generated responsive to actuation of button 172, and audio interface 206 including an analogue to digital and digital to analogue converter, a local processor 208 for controlling the operation of the communications interface module 170 and a local network communication module 210 including Bluetooth® wireless communications functionality, including a Bluetooth® antenna. The device communications interface module may be based upon a processor such as Texas Instruments AMM355x with associated Bluetooth interfaces.

One or more embodiments include the TETRA mobile station 102 and smart phone device 130 configured so that they may be in co-operative communication with one another through the communications interface module 170 and consequently both the TETRA mobile station 102 and smart phone device 130 may be in operation at the same time. The communications interface module 170 Bluetooth® identity is paired with the Bluetooth® identity of the smart phone device 130 so that they can communicate with each other when initialised. This does not preclude one or other of the TETRA mobile station 102 and smart phone device 130 being operated independently of the other device.

Figure 3:
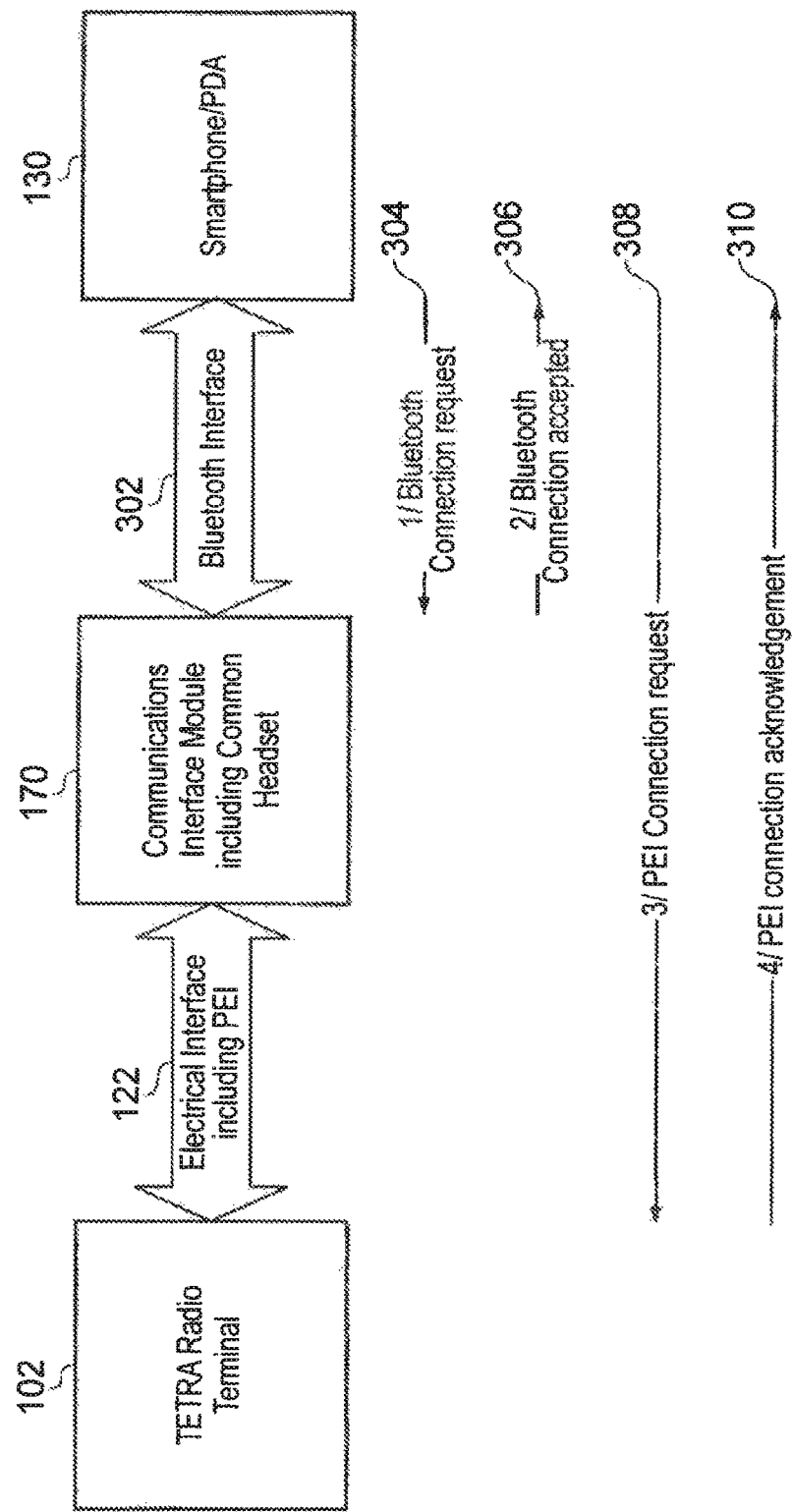
FIG. 3 is a flow diagram schematically illustrating the operational flow in an embodiment during power up and connection of a TETRA mobile station with a Smartphone.

FIG. 3 schematically illustrates power up of respective TETRA mobile station 102 and smart phone device 130 and their communications connection. The electrical interface for the TETRA mobile station 102 which includes the PEI module 122 and audio external headset interface is coupled to the communications interface module 170 when it is plugged into the TETRA mobile station 102. The audio external headset interface provides for audio signals to be coupled to the microphone 120 and earpiece 118 of a headset connected to the communications interface module 170. Power up of the TETRA mobile station 102 also provides electrical power over its electrical interface 122 to the electrical connector 202 of the communications interface module 170 in order to power the interface module. Responsive to the receipt of power, the local processor 208 boots up and initialises the PTT control module 204, audio AD/DA interface module 206 and local network communications module 210. In response to initialisation the local network communication modules 210 activates its Bluetooth® wireless communications functionality thereby making itself discoverable to other Bluetooth® enabled devices within wireless range.

The smart phone device 130 automatically boots up the communications interface middleware application 144 which initialises a search for a paired communications interface module 170 through the Bluetooth interface 152. Once the paired communications interface module 170 has been identified a Bluetooth connection request 304 is transmitted from smart phone device 130 over the Bluetooth interface 302 to the communications interface module 170. The Bluetooth® circuitry in the local network communications module 210 responds to the Bluetooth® connection request 304 after confirming the identity of the smart phone 130 in accordance with security protocols as defined by the Bluetooth standard. Additional application level security may also be provided between the middleware on the Smartphone and the application on the communications interface module if more secure connectivity is deemed necessary. This security could be provided using industry standard X509 certificate exchange or other security standard. The local network communications module 210 establishes an encrypted Bluetooth® path for communication with the smart phone 130 and sends a Bluetooth® connection accepted message 306.

Following setting up of an encrypted communications path between the smart phone device 130 and communications interface module 170 the communications interface middleware application 144 issues a PEI connection request 308 to establish a communications connection to the TETRA mobile station 102 through the PEI of the communications interface module 170. The TETRA mobile station 102 sends a PEI connection acknowledgement message 310 back to the smart phone device 130 to complete establishment of the communications connection. Smart phone device 130 utilises the communications connection with the TETRA mobile station 102 to make the PEI available to applications 144, such as client applications, on the smart phone device. One example of the client application is the remote presentation of the TETRA mobile station 102 Graphical User Interface (GUI) to the Smartphone interface. This GUI will provide a user with an interface to make changes to Talkgroups on the TETRA mobile station 102 without the need to access the TETRA mobile station 102 itself.

Additionally, responsive to power up the TETRA mobile station 102 connects to the TETRA network 166 via base station 154 and the smart phone device 130 connects to the cellular telephony network 168 over a station 158. The TETRA mobile station 102 receives network information relating to various network capabilities such as signal quality and available capacity, e.g. network congestion, in the network. Likewise, the smart phone device 130 receives information concerning signal quality and available bandwidth within the cellular telephony network, and other local network intelligence information from the central network application for improving the smart phone device's ability to make communications path decisions. Additionally, the TETRA mobile station 102 and smart phone device 130 may derive location information. The location information may be derived from an awareness of the base stations from which they may receive signals and, if at least one or other of the devices has a Global Positioning Satellite (GPS) receiver, based on GPS positioning signals. In general, the TETRA mobile station 102 includes a GPS receiver since location of emergency services personnel is important information for the emergency services.

FIG. 4 schematically illustrates the operational flow between the TETRA mobile station 102 and smart phone device 130 establishing an awareness of location. A smart phone device client application, which may either be a separate program or one that forms part of the middleware, uses the PEI connection to send a message 320 over the Bluetooth interface 302, via the communications interface module 170 and through the electrical interface 122 to the TETRA mobile station 102 requesting information concerning the GPS location, voice and data service availability over the TETRA network, the current activity of the TETRA mobile station and the Talkgroup to which the TETRA mobile station 102 is currently attached or active on. TETRA mobile station 102 responds to the request by sending a message 322 with the location and service information back to the smart phone device 130. Once the application on the Smartphone has established the best location fix it updates the infrastructure over the most appropriate network (bearer) path. The most appropriate network path is selected based upon a combination of local configuration parameters and dynamic parameters optionally updated from the infrastructure. This process allows dynamic mitigation of potential network congestion based upon conditions that may only be known to the MNO and/or the TNO network infrastructure.

The smart phone device 130 compares the information concerning service capability of the TETRA network 166 received from the TETRA mobile station 102 with the service capability data received from the cellular telephony network 168 to determine which network provide the best communications capability. The smart phone device 130 will periodically compare the information concerning service capability between the networks so that any changes can be compensated for, for example by selecting the other network should the currently selected network be determined as having a lower capability and the other network.

For example, if the most suitable network is considered to be the TETRA network 166 then the smart phone device 130 updates any infrastructure applications 162, 164 such as command and control systems with information concerning network capability over the TETRA network 166 and also sets up a communications connection through the communications interface module 170 to the TETRA mobile station 102 such that communications originating with the smart phone device 130 may be routed through the TETRA mobile station 102 and over the TETRA network 166. Conversely, if the cellular telephony network 168 is determined to have the greater capability the smart phone device 130 configures itself to use the cellular telephony network 168 for communications. Having determined which network has the greater communications capability, the smart phone device 130 transmits the GPS location of one or other of the TETRA mobile station 102 and smart phone device 130.

An aspect of TETRA radio systems, and indeed in some other PMR radio systems, is the ability for a TETRA mobile station to communicate with several other mobile stations at once. This may be described as group talking since a group of mobile stations are linked such that when any one of them initiates a group communication all the other mobile stations in the group that are within range of the network receive the group communication. This feature is often termed "Push To Talk" and goes by the acronym "PTT". Within the TETRA community the group of mobile stations is known as a "Talkgroup".

Referring now to FIG. 5, there is a schematic illustration of the operational flow between TETRA mobile station 102 and smart phone device 130 during group calling (i.e. a PTT operation). The client applications 144 on the smart phone device 130 are also configured to manage Talkgroup (PTT) communications. Cellular PTT applications for Smartphones are already available and the application on the smartphone device 130 may be configured to provide similar functionality. The PTT call is initiated by activating the PTT switch 172 on the communications interface module 170. The audio and PTT signaling are taken from the headset and PTT switch connected via the communications interface module 170 and converted to Internet Protocol signals for transmission over the public mobile radio network. Within the cellular telephony network communications are linked via a gateway to integrate the PTT group communications with the central TETRA network.

A Talkgroup is defined on the TETRA mobile station 102 by associating various mobile station identities within the group to form the Talkgroup. Talkgroup identities, known as Group Short Subscriber Identity (GSSI), are stored in the TETRA mobile station 102 and may be generated and set up using TETRA mobile station 102. In the illustrated embodiment smart phone device 130 sends a message 340 via the PEI interface interrogating the TETRA mobile station 102 for the current Talkgroup information, for example the network identities of individual mobile stations within the Talkgroup. The Talkgroup is returned to the smart phone device 130 and may consist of a label identifying a particular Talkgroup and/or a logically grouped list of mobile station identities forming the Talkgroup or some other representation of the Talkgroup.

The client application displays the Talkgroup 340 via a graphical user interface on the touchscreen display 132 of the smart phone device 130. Client application 144 is also configured to allow a user of the smart phone device 130 to modify the displayed Talkgroup through the graphical user interface. Modifications made to the Talkgroup via the graphical user interface are communicated over the communications interface module 170 to the TETRA mobile station 102 via the PEI 122 to modify correspondingly the Talkgroup stored in the TETRA mobile station 102. Optionally or additionally, modifications to the Talkgroup may be instructed over the air from the cellular telephony network 168 operator and/or a communication from the TETRA network 166 operator.

Responsive to actuation 342 of the PTT button 172, smart phone device 130 middleware application 144 compares the current network capability of the TETRA network 166 received from TETRA mobile station 102 with the current network capability for the cellular telephony network 168 to determine which network has the best communications capability. The comparison may be made on network capability information that has been periodically updated, or the smart phone device 130 may instruct TETRA mobile station 102 to update network capability information and provide the updated information to the smart phone device 130; the smart phone device 130 also obtaining network capability information from the cellular telephony network 168.

In the described embodiment, the default network for Talkgroup communications is the TETRA network 166 because Talkgroup communications are a common mode of communication within a PMR network such as TETRA, in particular when used by the emergency services. Thus, PTT signalling is routed to the TETRA mobile station 102 as a default 344. On the other hand, if the Push To Talk client application 144 of the smart phone device 130 makes a determination that the cellular telephony network 168 (MNO) has greater network capability or is more suitable, then the smart phone device middleware 144 instructs the communications interface module 170 to route PTT signaling, 346, to the PTT client application of smart phone device 130. PTT signaling is generally triggered on TETRA mobile station 102 devices by changing the impedance on the microphone circuit and therefore when the cellular telephony network is chosen, the communications interface module 170 is configured by way of signaling generated by the smart phone device 130 to intercept the impedance change to prevent activation of PTT signaling on the TETRA mobile station device 102 and instead generate signaling that can be transmitted to the smartphone device 130 over the Bluetooth® interface. If the PTT signaling is directed to TETRA mobile station 102 then, 348, the audio interface 206 is connected between the common headset 118/120 and the TETRA mobile station 102. On the other hand, if the PTT signaling is directed to the smart phone device 130 then, 350, the audio interface 206 is connected between the common headset 118/120 and the smart phone device 130.

In the event that the smart phone communications interface middleware application 144 determines that the cellular telephony network 168 (MNO) should be used for communications a message is automatically sent to the data application 164 in order to ensure that received PTT communications are routed via the cellular telephony network 168 (MNO) to the smart phone device 130 and presented to the common headset 118/120 of the communications interface module 170.

The operational flow for an individual call in accordance with an embodiment is schematically illustrated in FIG. 6. For the described embodiment, individual calls are setup using a phonebook stored in the smartphone device 130, since the smart phone has a more flexible and easier to use graphical user interface than the user interface typically provided for TETRA mobile station 102. The user selects a contact from the phonebook and initiates the call, 360, using the graphical user interface of the smart phone device 130. The phone book on the smartphone device 130 is an application that is configured to communicate any call setups via the middleware on the device 130. The middleware on the device 130 then routes the call to the most appropriate network. The middleware also handles any additional routing digits if required by the TETRA network or cellular telephony network.

Again, smart phone device 130 middleware application 144 compares the current network capability of the TETRA network 166 received from TETRA mobile station 102 with the current network capability for the cellular telephony network 168 to determine which network has the best communications capability. The comparison may be made on network capability information that has been periodically updated, or the smart phone device 130 may instruct TETRA mobile station 102 to update network capability information and provide the updated information to the smart phone device 130; the smart phone device 130 also obtaining network capability information from the cellular telephony network 168. The smart phone device 130 middleware application 144 compares the network capability of the TETRA and cellular networks to determine which has the better capability and should be used Depending upon which network is selected by the middleware application 144, the individual call is our setup over the cellular telephony network 168 (MNO bearer) or the TETRA network 166. For calls originating from the network, the communications control in the network, i.e. the TETRA network, will select whether not use the TETRA network or cellular telephony network to transmit the call. Additionally, the smart phone device 130 can stay in a low-power mode until it is signalled to respond to an incoming voice calls over the cellular telephony network. Calling Line Identification (CLI) may also be presented by the smart phone device 130 graphical user interface.

If the call is determined to be set up, 362, over the cellular telephony network 168 (MNO network) the call is initiated in the usual manner from the smart phone device 130. Accordingly, the audio module 206 is connected, 366, between the common headset 118/120 and smartphone 130. If the call is determined to be set up, 364, with the TETRA network 166, the smart phone device 130 communicates call setup data and voice data over the Bluetooth® interface 302 with the and via the PEI 122 to the TETRA mobile station 102. The TETRA mobile station 102 then initiates the call over the TETRA network 166. Accordingly, the audio module 206 is connected, 368, between the common headset 118/120 and the TETRA mobile station 102. Optionally, in the event of covert operations the audio could also be presented to the smart phone device 130 such that a user could be receiving communications over the TETRA network yet appear to be using a cellular telephony network.

The middleware application 144 for determining which network to use may be configured to prefer calls to be sent over the TETRA network since that will avoid the call charges levied for the public cellular telephony network.

For the described embodiments, data communications utilise the smart phone graphical user interface for the simple reason that the graphical user interface available on the smart phone provides for flexible data activities, for example web browsing. The smart phone data application and 144 will be configured to use the common headset 118/122 provides for either voice recognition and/or audio response to an end user. For inbound data the smart phone device 130 may remain a low-power state and only activate the cellular telephony network 168 (MNO bearer) when it is signalled to do so over the TETRA network 166. The data path selected is controlled by middleware application 144 in the smartphone device 130 and is configured to choose the best network available for the data communication required. The selection of data bearer will follow similar criteria to voice communications i.e. an algorithim based on local configuration, network availability, network congestion and known events, however additionally available data bandwidth will also be an additional criteria.

FIG. 7 is a schematic illustration of the operational flow between the TETRA mobile station 102 and the smart phone device 130 for data communications. A data client application 144 running on the smart phone device 130 issues a request for a data network service to the communications interface middleware for a data communications network service based upon the periodic network capability information received from the TETRA network 166 and the cellular telephony network 168 or upon updated information requested responses to the request for a data network service. The communications interface middleware select the most appropriate data network dependent upon the received network capability information. The client data application 144 is informed of the data network selection made by the middleware and the data client application sends data via the communications interface middleware, 380, to the communications interface module 170.

If the cellular telephony network 168 (MNO bearer) is selected then data is sent over the network, 382, direct from the smart phone device 130. Optionally, and audio response may be sent, 386, to the common headset 118/120. Further optionally or additionally, audio signals may be transmitted from the common headset 118/120 for voice recognition control of smartphone device 130. On the other hand, if the TETRA network 166 is selected the middleware application 144 establishes a data connection over the Bluetooth interface 302® to the communications interface module 170 and then via the PEI 122 to the TETRA mobile station 102 from where it is transmitted over the TETRA network 166.

In view of the foregoing description it will be evident to a person skilled in the art that various modifications may be made within the scope of the invention.

Although embodiments in accordance with the present invention have been described with reference to a communications interface module physically separate from the TETRA mobile station 102 and the smart phone device 130, the communications interface module may be incorporated in one or other of the devices, more particularly within the TETRA mobile station 102. Furthermore, the term mobile station, base station and acronym BS are not intended to restrict embodiments in accordance with the invention to systems, standards or protocols using such terminology but are generally intended to refer to communications equipment serving a geographic area with radio communications coverage providing downlink and/or uplink communications.

The communications interface module 170 has been described as having a wireless (Bluetooth®) local network connection to the smart phone device 130 but other wireless communications protocols may be utilised such as Wi-Fi. Optionally or additionally, the communications interface module 170 may be coupled to the smart phone device 130 by a wired connection such as a curly cable.

Although the communications interface module 170 has been described as having a wired connection to a microphone and earpiece, embodiments may be conceived in which the microphone and a speaker are integrated in the communications interface module 170 itself. Additionally or optionally, the communications interface module 170 may also include a "talk" initiation switch for initiating "one-to-one" communications from the communications interface module 170 over the public mobile network.

Insofar as embodiments of the invention described above are implementable, at least in part, using a software-controlled programmable processing device such as a general purpose processor or special-purposes processor, digital signal processor, microprocessor, or other processing device, data processing apparatus or computer system it will be appreciated that a computer program for configuring a programmable device, apparatus or system to implement the foregoing described methods, apparatus and system is envisaged as an aspect of the present invention. The computer program may be embodied as any suitable type of code, such as source code, object code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, JAVA, ActiveX, assembly language, machine code, and so forth. A skilled person would readily understand that term "computer" in its most general sense encompasses programmable devices such as referred to above, and data processing apparatus and computer systems.

Suitably, the computer program is stored on a carrier medium in machine readable form, for example the carrier medium may comprise memory, removable or non-removable media, erasable or non-erasable media, writeable or re-writeable media, digital or analog media, hard disk, floppy disk, Compact Disk Read Only Memory (CD-ROM), Company Disk Recordable (CD-R), Compact Disk Rewriteable (CD-RW), optical disk, magnetic media, magneto-optical media, removable memory cards or disks, various types of Digital Versatile Disk (DVD) subscriber identify module, tape, cassette solid-state memory. The computer program may be supplied from a remote source embodied in the communications medium such as an electronic signal, radio frequency carrier wave or optical carrier waves. Such carrier media are also envisaged as aspects of the present invention.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the invention. This is done merely for convenience and to give a general sense of the invention. This description should be read to include one or at least one and the singular also includes the plural unless it is obvious that it is meant otherwise.

The scope of the present disclosure includes any novel feature or combination of features disclosed therein either explicitly or implicitly or any generalisation thereof irrespective of whether or not it relates to the claimed invention or mitigate against any or all of the problems addressed by the present invention. The applicant hereby gives notice that new claims may be formulated to such features during prosecution of this application or of any such further application derived therefrom. In particular, with reference to the appended claims, features from dependent claims may be combined with those of the independent claims and features from respective independent claims may be combined in any appropriate manner and not merely in specific combinations enumerated in the claims.

I claim:

1. A communications assembly, comprising:
   a first mobile station communicatively coupled to a public mobile radio network;
   a second mobile station communicatively coupled to a private mobile radio network; and
   a communications interface module configured to provide a communication conduit between the first mobile station and second mobile station, for routing:
      a communication originating from the first mobile station through the communications interface module for transmission over the private mobile radio network via the second mobile station; and
      a communication initiated at the communications interface module for transmission over the public mobile radio network via the first mobile station, wherein the communications interface module includes a push to talk (PTT) switch, and further wherein the first mobile station is configured to compare network capability of the private mobile radio network with network capability of the public mobile radio network in response to an actuation of the PTT switch, wherein the first mobile station is configured to send an instruction to the communication interface module to route PTT signaling to the first mobile station when the network capability of the public mobile radio network is greater than the network capability of the private mobile radio network.

2. The communications assembly of claim 1, wherein:
   the communications interface module is a separate article from the first mobile station and second mobile station and is configured to interengage with the second mobile station to provide electrical connection for electronic communication between the communications interface module and the second mobile station, the electrical connection comprising a part of the communications conduit; and
   the communications interface module comprises a local network communications module for establishing a communications connection between the first mobile station and the communications interface module, the communications connection comprising a remaining part of the communications conduit.

3. The communications assembly of claim 1, wherein the public mobile radio network is a cellular telephone network and the private mobile radio network is a terrestrial trunked radio (TETRA) network.

4. The communications assembly of claim 1, wherein the communication interface module, in response to receiving the instruction from the first mobile station, inhibits an impedance change on a microphone circuit of the second mobile station to prevent activation of PTT signaling on the second mobile station.

5. The communications assembly of claim 1, wherein the first mobile station is configured to send an instruction to the communication interface module to route PTT signaling to the second mobile station when the network capability of the private mobile radio network is greater than the network capability of the public mobile radio network.

6. The communications assembly of claim 1, wherein the first mobile station is configured to receive talkgroup information from the second mobile station via the communication interface module and further modify the talkgroup information and send the modified talkgroup information to the second mobile station via the communication interface module.

7. A communications assembly, comprising:
- a first mobile station communicatively coupled to a public mobile radio network;
- a second mobile station communicatively coupled to a private mobile radio network; and
- a communications interface module configured to provide a communication conduit between the first mobile station and second mobile station, for routing:
  - a communication originating from the first mobile station through the communications interface module for transmission over the private mobile radio network via the second mobile station; and
  - a communication initiated at the communications interface module for transmission over the public mobile radio network via the first mobile station, wherein the communications interface module includes a push to talk (PTT) switch, and further wherein the first mobile station is configured to compare network capability of the private mobile radio network with network capability of the public mobile radio network in response to an actuation of the PTT switch, wherein the first mobile station is configured to send an instruction to the communication interface module to route PTT signaling to the second mobile station when the network capability of the private mobile radio network is greater than the network capability of the public mobile radio network.

* * * * *